Aug. 8, 1967 N. C. LUND 3,335,232

TELEPHONE DIALING DEVICE

Filed May 13, 1964 3 Sheets-Sheet 1

INVENTOR.
NELSON C. LUND
BY
Walter J Wessendorf Jr
Attorney

Aug. 8, 1967 N. C. LUND 3,335,232

TELEPHONE DIALING DEVICE

Filed May 13, 1964 3 Sheets-Sheet 2

INVENTOR.
NELSON C. LUND
BY
Walter J. Wessendorf, Jr.
Attorney

Aug. 8, 1967 N. C. LUND 3,335,232

TELEPHONE DIALING DEVICE

Filed May 13, 1964 3 Sheets-Sheet 3

INVENTOR.
NELSON C. LUND
BY
Walter J. Wessendorf Jr.
Attorney

United States Patent Office 3,335,232

Patented Aug. 8, 1967

3,335,232

TELEPHONE DIALING DEVICE

Nelson C. Lund, Woodstock, N.Y., assignor to Lloyd W. Lund, Woodstock, N.Y.

Filed May 13, 1964, Ser. No. 367,092

15 Claims. (Cl. 179—90)

This invention relates to a telephone dialing device for use with a conventional dial telephone for dialing a discrete telephone number.

The problems in the art to which this invention apertains are the need for a telephone dialing device which is mechanical in structure, which has a minimum of mechanical parts, which is compact, which is without error in operation, which is of durable construction, which is adapted for easy mounting and removal from a conventional dial telephone and which is adapted for conventional dialing of telephone numbers when mounted on a conventional dial telephone.

Accordingly, one of the objects of this invention is to provide a telephone dialing device which is mechanical in structure.

Another object of this invention is to provide a telephone dialing device which has a minimum of mechanical parts.

A further object of this invention is to provide a telephone dialing device which is compact and which occupies a minimum of space.

Still another object of this invention is to provide a telephone dialing device having an insertable pre-punched card corresponding to a discrete telephone number and when such card is utilized with the telephone dialing device the dialing of such discrete telephone number is without error.

Another object of this invention is to provide a telephone dialing device whose components in associative relationship render the compact telephone dialing device durable in its construction.

A further object of the invention is to provide a telephone dialing device having an L-shaped holder, disc and depending finger which renders easy and simple the mounting and removal of the telephone dialing device with respect to a conventional dial telephone.

A still further object of this invention is to provide a telephone dialing device having a locking lever for cooperation with the components of the telephone dialing device, and, which lever when actuated adapts the mounted telephone dialing device for conventional telephone number dialing.

These objects and further objects of this invention should be discerned and appreciated by reference to the detailed specification taken in conjunction with the drawings, wherein like reference numerals refer to similar parts throughout the several views, in which.

Figure 1:
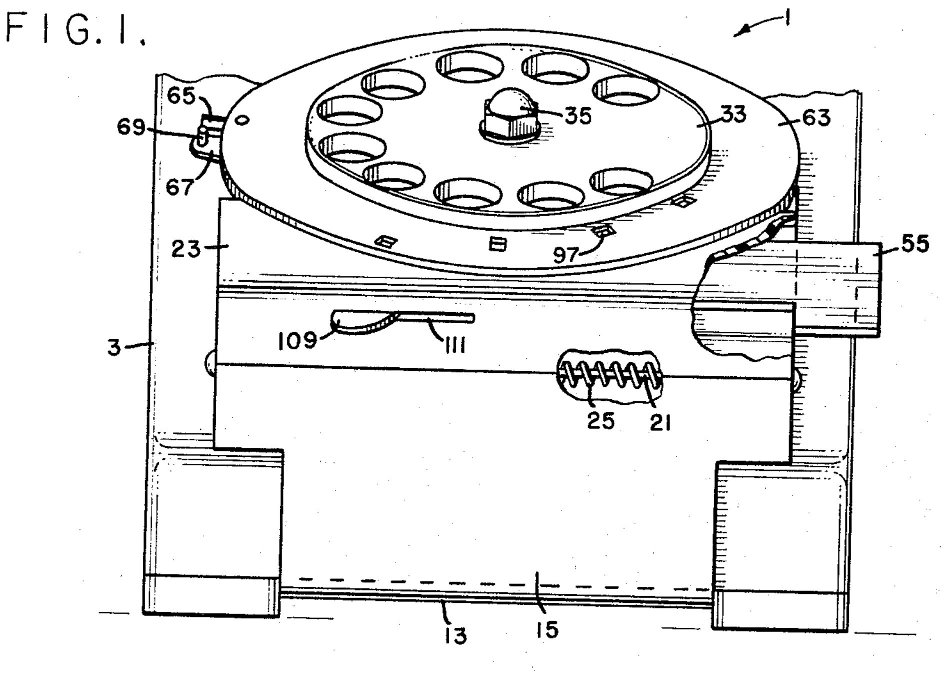
FIG. 1 is a front view of the invention.

Reference numeral 1 generally refers to the telephone dialing device emplaced upon a conventional dial telephone 3 having a base 5, conventional dial 7 and dial number indicator 9. An L-shaped holder 11 has legs 13 and 15 which when emplaced upon a conventional dial telephone 3 engage in abutting relationship with the bottom 17 and front 19 of base 5.

Transversely disposed pin 21 carried at the upper portion of leg 15 pivotally mounts support frame 23. Torsion spring 25 carried on pin 21 has tails (not shown). One of the tails is fixed to leg 15 and the other tail is fixed to support frame 23 whereby the holder 11 and support frame 23 are constrained to movement toward each other.

Integral with and extending from support frame 23 is a support plate 27 having a dial shaft 29 disposed transversely thereto and freely mounted therewith. Dial shaft 29 has an upper shouldered portion, threaded thereat at 31, and which has fixed therewith a dial 33 by means of the hexagonal cap nut 35. Dial 33 is similar to conventional dial 7. Dial shaft 29 has a lower shouldered portion, threaded thereat at 37, and which is engaged in fixed relationship with the tapped hole 39 formed in disc 41.

Disc 41 has a center portion 43 that is complemental to the configuration of dial number indicator 9, and has a depending finger for complemental reception within the zero hole of the conventional dial 7. When depending finger 45 is received within the zero hole of conventional dial 7, the zero hole of dial 33 will be in alignment with the zero hole of conventional dial 7.

It should be appreciated that by means of the cooperation of the center portion 43 with the dial number indicator 9, the depending finger 45 received within the zero hole of conventional dial 7, the torsion spring 25, legs 13 and 15 with the respective bottom 17 and front 19 of base 5, the telephone dialing device 1 will be held snugly on the conventional dial telephone 3 when emplaced thereon.

Integral with and upstanding from support plate 27 is the card carrier receiver 47 comprising longitudinal brackets 49 and 51 and end wall 53 configured thusly as a rectangular slot to receive the rectangularly configured card carrier 55. Card carrier 55 has a rectangular portion 57 removed therefrom and in which a rectangular card 59 is complementally received. Card carrier 55 has serrations 61 formed along one longitudinal side thereof.

Also in fixed relationship with dial shaft 29 is the dial plate 63 having fixed therewith and depending from the bottom portion thereof an actuating arm 65. Freely mounted on the dial shaft 29 is an actuating lever 67 having an upstanding pin 69 aligned for engagement by the actuating arm 65. Fixed to actuating lever 67 is a pawl leg 71 having a spring pawl 73.

Figure 4:
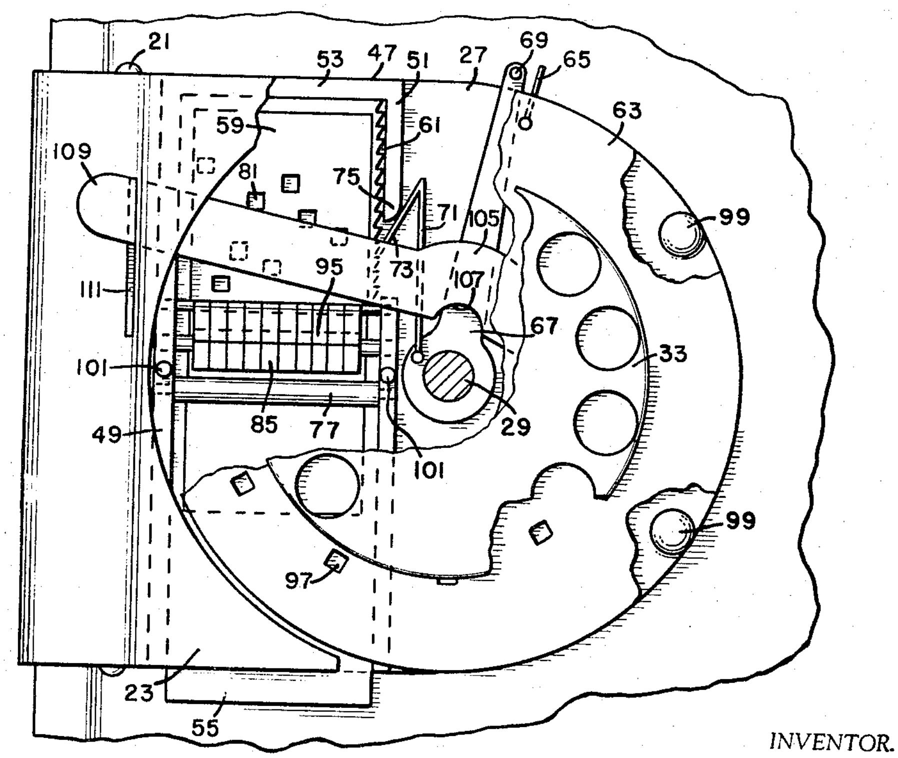
FIG. 4 is a view of the invention partly broken away, taken in the direction of the arrow A of FIG. 3.
Figure 5:
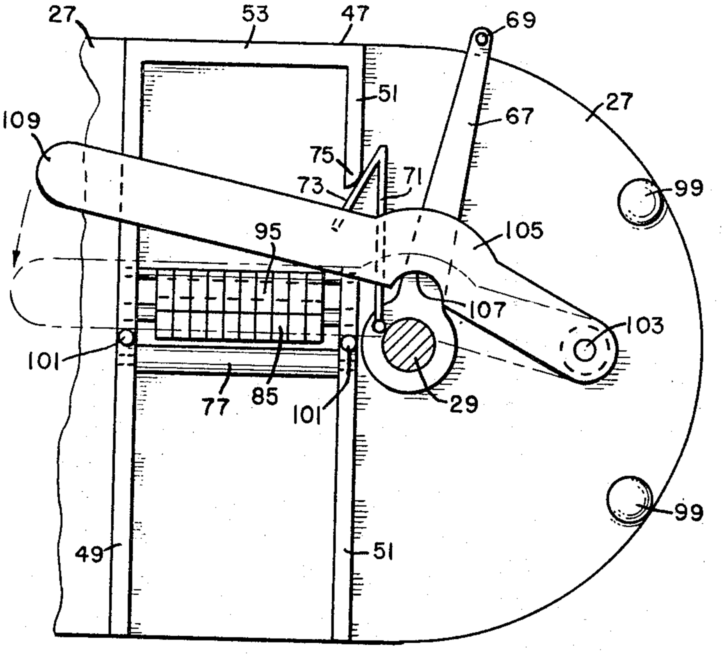
FIG. 5 is a top view of the support frame, card carrier receiver, spring fingers, rocker arms, actuating lever and locking lever.
Figure 6:
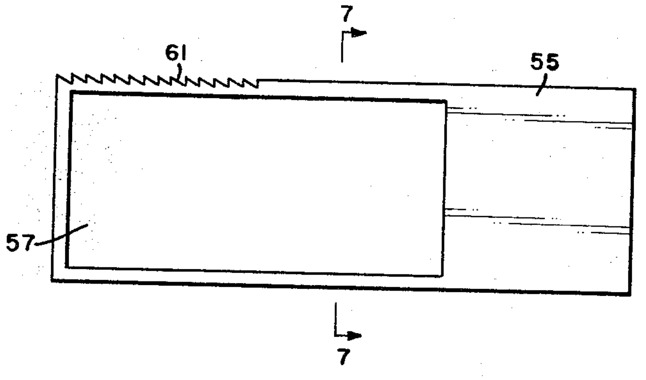
FIG. 6 is a top view of the card carrier.
Figure 7:
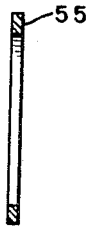
FIG. 7 is a sectional view taken along the line 7—7 of FIG. 6.

With reference to FIGS. 4 and 5, when actuating arm 65 engages upstanding pin 69, actuating lever 67 moves counter-clockwise carrying pawl leg 71 downwardly with spring pawl 73 riding against the nose portion 75 formed of longitudinal bracket 51. It should be noted that in the vicinity of nose 75 part of longitudinal bracket 51 is removed to allow movement of spring pawl 73. Upon downward movement of pawl leg 71 the end of spring pawl 73 engages that one of the serrations 61 immediately adjacent thereto and moves card carrier 55 downwardly an increment of one serration. As spring pawl 73 rides against nose 75 and upon further downward movement of pawl leg 71, an increasing compressive force component is imposed upon spring pawl 73. When spring pawl 73 is relieved of this force component, spring pawl 73 rides upwardly, by restoring force action, against nose 75. Hence, the end of spring pawl 73 is disengaged from its immediately adjacent serration 61. Accordingly, spring pawl 73 will thusly be in position for engagement with another adjacent serration upon counterclockwise movement of actuating lever 67.

The card carrier 55 with the rectangular card 59 emplaced therein is inserted in the free end of card carrier receiver 47, and this free end is of course the bottom of the card carrier receiver 47 from which the card carrier 55 emerges in increments of serrations in the operation of the telephone dialing device. The card carrier 55 having emplaced therein the rectangular card 59 is inserted beneath the soft rubber roller 77 mounted by means of the transversely disposed pin 79 freely mounted on longitudinal brackets 49 and 51. This soft rubber roller 77 functions to maintain the card 59 flat in the card carrier 55 and card carrier receiver 47 and which functions as an attribute in the feeding operation described hereinafter. It should be further noted that when the card carrier 55 is initially inserted in the card carrier receiver 47, such insertion is to the full extent in order that the card carrier 55 abuts end wall 53.

Conventional telephone dials have ten dialing holes numbered, 1, 2, 3, 4, 5, 6, 7, 8, 9 and 0. Corresponding with dialing hole number 2 are the letters A B C; corresponding with dialing hole number 3 are the letters D E F; corresponding with dialing hole number 4 are the letters G H I; corresponding with dialing hole number 5 are the letters J K L; corresponding with dialing hole number 6 are the letters M N O; corresponding with dialing hole number 7 are the letters P R S; corresponding with dialing hole number 8 are the letters T U V; and corresponding with dialing hole number 9 are the letters W X Y.

Accordingly, if one desires to dial a fictitious Washington telephone number RU 30498, one manipulates for local dialing by successive dialings the dialing hole numbers 7, 8, 3, 0, 4, 9 and 8. If one desires to dial this telephone number long distance direct, one manipulates by successive dialings the dialing hole numbers 1, 2, 0, 2, 7, 8, 3, 0, 4, 9 and 8. The number 202 of course is the Washington area code.

A rectangular card 59 is adapted for either direct long distance dialing or local direct dialing by having, respectively, either eleven holes or seven holes punched in card 59 corresponding to the dialing hole numbers. Each punched hole 81 therefore corresponds to one of the ten dialing hole number positions on the telephone dial 7. As viewed in the longitudinal direction of rectangular card 59, the ten dialing hole number positions are in columnar arrangement with the sequence of the telephone number in rows beginning with the first bottom row.

Viewing card 59 in FIG. 4, from bottom to top in the longitudinal direction, the punched hole in the first bottom row of card 59 corresponds to the number dialing hole position of either the first dialing hole position of the telephone number depending on whether a local telephone number is to be dialed or whether a long distance telephone number is to be dialed. The punched hole in the second of card 59 corresponds to the second number dialing hole position. And each succeeding punched hole of card 59 corresponds to each succeeding number dialing hole position.

Figure 2:
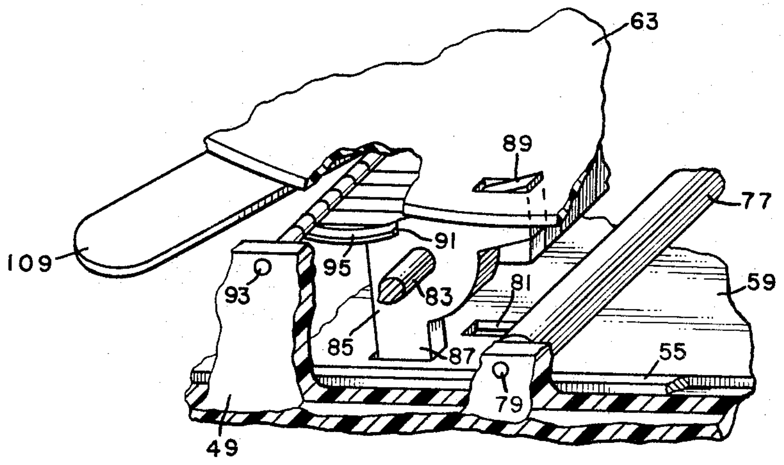
FIG. 2 is a perspective view, partly in section, showing the dial plate, spring fingers, rocker arms and card.
Figure 3:
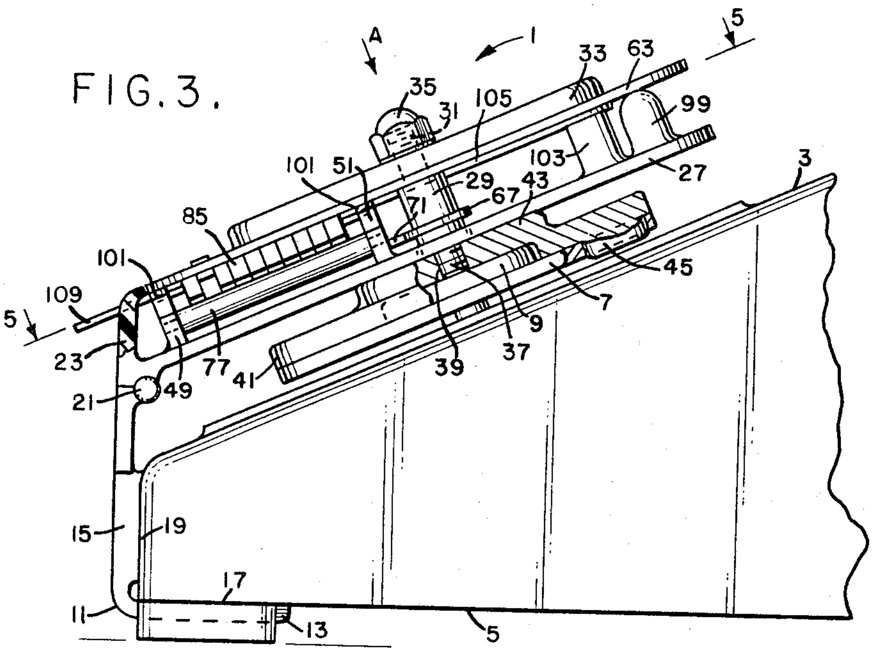
FIG. 3 is a side view, partly broken away and in section, of the invention.

Freely mounted on rock shaft 83 carried by the longitudinal brackets 49 and 51 are ten L-shaped rocker arms 85. Each rocker arm 85 has a lower depending leg 87 and a laterally extending leg 89. Each rocker arm 85 has a notched shoulder 91, as shown. Carried on a transversely disposed spring rod 93 mounted on the longitudinal brackets 49 and 51 are ten spring fingers 95. A portion of one of said spring fingers 95 is engaged in abutting relationship with the notched shoulder 91 of one of said rocker arms 85 and exerts upon its associated rocker arm 85 a compressive force component constraining its associated rocker arm to counter-clockwise movement on rock shaft 83 as viewed in FIG. 2.

Dial plate 63 has ten holes 97 punched therethrough which are in angular spaced relationship and radially disposed thereon. Each punched hole 97 upon sufficient angular movement being imparted to dial plate 63 will register with the columnar dialing hole value of the punched hole 81 of card 59. Taken into consideration in the arrangement and disposition of holes 97 in dial plate 63 is the fact that the angular distance increments between holes 97 corresponding to dialing holes 1, 2, 3, 4, 5, 6, 7, 8, 9, 0 are the same, and the fact that the angular distance from initial dialing to dialing hole position number 1 is greater than any of the angular distance increments.

The hole 81 in the first bottom row of card 59 is disposed in the one of the ten columns that corresponds to the first dialing number position of the telephone number to be dialed. This hole is also located on card 59 such that the card carrier 55 may be inserted fully within card carrier receiver 47 and such that this hole will be aligned with the corresponding rocker arm 85 to permit its lower depending leg 87 to be partially received complementally in this hole. Thereby this corresponding rocker arm 85 is partially rotated counter-clockwise to the extent that the upper leading edge of its laterally extending leg 89 will be in abutting relationship with the lower surface of dial plate 63. When dial plate 63 is rotated sufficiently in a clockwise direction this laterally extending leg 89 will engage corresponding hole 97 of dial plate 63 and occupy the exemplary position shown in FIG. 2 with the result that further clockwise movement of dial plate 63 will be prevented.

To prevent the end of spring pawl 73 from engaging serrations 61 while inserting card carrier 55 in the card carrier receiver 47, one moves actuating lever 67 sufficiently to the right and after card carrier 55 is fully inserted, the actuating lever 67 is released. The counter-clockwise return action of the conventional dial 7 will cause actuating arm 65 to abut upstanding pin 69 and thereby return spring pawl 73 to the position of engagement with one of the serrations 61.

It should be appreciated that when the dial 33 is used to dial the telephone number, the index finger is always placed in the zero hole of dial 33. The telephone number is dialed by the sequence of rotating dial 33 clockwise and allowing dial 33 to return. In the counter-clockwise return of dial plate 63 its lower surface will abut and effect clockwise rotation of laterally extending leg 89. This clockwise rotation of rocker arm 85 frees laterally extending leg 89 from engagement with hole 97 and frees depending leg 87 from engagement with hole 81.

In the further counter-clockwise return of dial plate 63 the actuating arm 65 engages upstanding pin 69 and rotates actuating lever 67 counter-clockwise with the result that spring pawl 73 will engage the next serration and move card 59 downwardly an increment with alignment of a hole 81 of the second row with its corresponding lower depending leg 87.

Carried on support plate 27 are two upstanding supports 99. Carried on each of the longitudinal brackets 49 and 51 is an upstanding pin support 101. The dial plate 63 rests upon supports 99 and 101 to thereby obviate wobble of dial plate 63 upon movement of same.

Pivotally mounted on a pintle 103 upstanding from support plate 27 is a flat locking lever 105 having a semi-circular cut-out portion 107 complemental to the dial shaft 29. The handle 109 of locking lever 105 extends through and is guided by an elongated slot 111 formed through support frame 23. When locking lever 105 is moved to the position shown by the dashed lines in FIG. 5, the lower surface of locking lever 105 will be engaged with the ten laterally extending legs 89 and thereby maintain the rocker arms 85 in their inoperative positions free from any engagement with either of the punched holes 81 or 97. Hence, one will be able to dial a telephone number in the conventional manner by conventional manipulation of dial 33.

It is within the concept of this invention to provide in excess of eleven rows of punched holes 81 in the rectagular card 59 in contemplation of any increase in the present eleven dialing numbers required at present to effect long distance dialing of a telephone number.

Having thusly described my invention, I claim:

1. A telephone dialing device for use with a conventional dial telephone for dialing a discrete telephone number; said telephone dialing device comprising a support frame, dial shaft, dial similar to a conventional telephone dial and aligned therewith, dial plate, disc, card carrier, card, actuating lever, rocker arms and spring fingers; said support frame having a support plate, said support plate mounting said dial shaft, said dial shaft co-rotatably carrying said dial, dial plate and disc and freely mounting said actuating lever, said disc being adapted for mounting on the conventional dial of said conventional dial telephone and having a depending finger adapted to be received in the zero dialing hole of said conventional dial, said support plate having a card carrier receiver for receiving said card carrier, said card carrier receiving said card, said card having holes punched therethrough corresponding to the number dialing positions of said discrete telephone number, said dial plate having holes punched therethrough corresponding to the ten number dialing hole positions of said conventional telephone dial, said card carrier receiver mounting said rocker arms and spring fingers, each one of said rocker arms being constrained to movement by one of said spring fingers associated therewith, said actuating lever carrying a spring pawl, said spring pawl being engageable with said card carrier, said dial plate having an actuating arm, said actuating arm being adapted to engage said actuating lever; upon insertion of said card carrier in said card carrier receiver one of said rocker arms engaging one of said punched holes in said card corresponding to the first one of said number dialing positions of said discrete telephone number with subsequent engagement of said engaged rocker arm with the discrete one of said punched holes of said dial plate corresponding to said first number dialing position upon movement of said dial plate thereby preventing further movement of same, and upon release from movement of said dial plate said actuating arm engaging said actuating lever and moving said spring pawl into engagement with said card carrier to thereby move said card carrier a discrete increment of distance for engagement of one of said rocker arms with one of said punched holes of said card corresponding with the second one of said number dialing positions of said discrete telephone number, and with sequential dialing of the remaining number dialing positions of said discrete telephone number being effectuated upon sequential movement and release from movement of said dial plate.

2. The subject matter as claimed in claim 1, wherein said telephone dialing device further comprises an L-shaped holder, wherein said L-shaped holder pivotally mounts said support frame and wherein said L-shaped holder has legs engaged in abutting relationship with the base of said conventional dial telephone when emplaced upon same.

3. The subject matter as claimed in claim 2, wherein said L-shaped holder carries a transversely disposed pin for pivotal mounting of said support frame, wherein said transversely disposed pin carries a torsion spring, and wherein one of the tails of said spring is fixed to said L-shaped holder and the other one of the tails of said spring is fixed to said support frame.

4. The subject matter as claimed in claim 1, wherein said dial shaft has an upper shouldered portion, threaded thereat, and wherein a cap screw engaged with said threaded portion fixedly mounts said dial and dial plate thereat.

5. The subject matter as claimed in claim 1, wherein said dial shaft has a lower shouldered portion, threaded thereat, wherein said disc has a tapped hole formed therein, and wherein said threaded portion is fixedly engaged with said tapped hole.

6. The subject matter as claimed in claim 1, wherein said card carrier receiver comprises longitudinal brackets and an end wall configured as a rectangular slot and wherein one of said longitudinal brackets has a portion thereof formed as a nose against which said spring pawl rides.

7. The subject matter as claimed in claim 1, wherein said card carrier has a rectangular portion removed therefrom for complemental reception of said card and wherein said card carrier has serrations formed along one of its longitudinal sides for engagement by said spring pawl.

8. The subject matter as claimed in claim 1, wherein said holes punched through said card corresponding to the ten number dialing hole positions are arranged and disposed in columnar arrangement and with said discrete telephone number arranged and disposed in rows.

9. The subject matter as claimed in claim 1, wherein each one of said rocker arms has a lower depending leg for engagement with one of said punched holes of said card and a laterally extending leg for engagement with one of said punched holes of said dial plate.

10. The subject matter as claimed in claim 1, wherein is further provided a transversely disposed spring rod mounted in said card carrier receiver, wherein said spring rod carries said spring fingers, wherein each rocker arm has a notched shoulder and wherein one of said spring fingers is engaged in abutting relationship with said notched shoulder of one of said rocker arms.

11. The subject matter as claimed in claim 1, wherein said punched holes of said dial plate are radially disposed thereon in angular spaced relationship from one another.

12. The subject matter as claimed in claim 1, wherein are further provided upstanding supports on said support plate and upstanding pin supports on said card carrier receiver and wherein said dial plate abuts said upstanding supports and upstanding pin supports to obviate wobble of said dial plate upon movement of same.

13. The subject matter as claimed in claim 1, wherein is further provided a locking lever carried by said support plate and wherein said locking lever is adapted for movement to a position of engagement with said rocker arms whereby any of said rocker arms is prevented from engaging any of said punched holes of said card or dial plate.

14. The subject matter as claimed in claim 13, wherein said locking arm has a handle, wherein said support frame has formed therethrough an elongated slot and wherein said handle extends through and is guided by said elongated slot.

15. The subject matter as claimed in claim 1, wherein is further provided a roller carried on a pin mounted in said card carrier receiver and wherein said roller maintain said card and card carrier flat when inserted in said card carrier receiver.

No references cited.

KATHLEEN H. CLAFFY, *Primary Examiner.*

A. H. GESS, *Assistant Examiner.*